(12) United States Patent
Casper et al.

(10) Patent No.: US 7,178,391 B2
(45) Date of Patent: Feb. 20, 2007

(54) INSERTION TUBE METHODS AND APPARATUS

(75) Inventors: William L. Casper, deceased, late of Rigby, ID (US); by Chris Casper, legal representative, Rigby, ID (US); Don T. Clark, Idaho Falls, ID (US); Blair K. Grover, Idaho Falls, ID (US); Rodney O. Mathewson, Idaho Falls, ID (US); Craig A. Seymour, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/200,752

(22) Filed: Aug. 9, 2005

(65) Prior Publication Data

US 2006/0032629 A1 Feb. 16, 2006

Related U.S. Application Data

(60) Continuation-in-part of application No. 10/910,860, filed on Aug. 3, 2004, now abandoned, which is a division of application No. 10/285,786, filed on Oct. 31, 2002, now abandoned.

(51) Int. Cl.
*G01N 1/26* (2006.01)
*G01L 7/18* (2006.01)
*E21B 49/08* (2006.01)
*F16L 25/14* (2006.01)

(52) U.S. Cl. .................. 73/152.05; 73/73; 73/152.23; 73/152.41; 73/863.81; 175/59; 285/333; 285/334

(58) Field of Classification Search .................. 73/73, 73/152.05, 152.06, 152.4, 11, 152.54, 29.02, 73/863.81, 864.34, 864.74; 137/78.2, 78.3; 175/59, 60; 285/333, 334, 332.4
See application file for complete search history.

(56) References Cited

U.S. PATENT DOCUMENTS 2,150,221 A 3/1939 Hinderliter
3,659,882 A 5/1972 Souresny (Continued)

OTHER PUBLICATIONS

"Long Term Stewardship Technology Analysis of the Office of Science and Technology Profile" published Sep. 2001 by Idaho National Engineering and Environmental Laboratory (INEEL), Idaho Falls, Idaho 83415, pp. 30, 165 and 187 of 235.

(Continued)

*Primary Examiner*—Hezron Williams
*Assistant Examiner*—David A. Rogers
(74) *Attorney, Agent, or Firm*—Wells St. John, P.S.

(57) ABSTRACT

A drill string comprises a first drill string member having a male end; and a second drill string member having a female end configured to be joined to the male end of the first drill string member, the male end having a threaded portion including generally square threads, the male end having a non-threaded extension portion coaxial with the threaded portion, and the male end further having a bearing surface, the female end having a female threaded portion having corresponding female threads, the female end having a non-threaded extension portion coaxial with the female threaded portion, and the female end having a bearing surface. Installation methods, including methods of installing instrumented probes are also provided.

16 Claims, 6 Drawing Sheets

U.S. PATENT DOCUMENTS

| | | | | |
|---|---|---|---|---|
| 3,898,872 | A * | 8/1975 | Skaling et al. | 73/73 |
| 3,910,300 | A * | 10/1975 | Tal | 137/78.3 |
| 3,961,753 | A * | 6/1976 | Sears | 239/64 |
| 4,068,525 | A * | 1/1978 | Skaling | 73/73 |
| 4,410,204 | A | 10/1983 | Reimert | |
| 4,548,266 | A * | 10/1985 | Burklund | 166/250.08 |
| 4,655,076 | A * | 4/1987 | Weihe et al. | 73/73 |
| 4,669,554 | A | 6/1987 | Cordry | |
| 4,679,422 | A * | 7/1987 | Rubin et al. | 73/38 |
| 4,735,444 | A * | 4/1988 | Skipper | 285/288.1 |
| 4,804,050 | A * | 2/1989 | Kerfoot | 175/20 |
| 4,807,707 | A | 2/1989 | Handley et al. | |
| 4,915,426 | A * | 4/1990 | Skipper | 285/288.1 |
| 4,922,945 | A * | 5/1990 | Browne | 137/78.3 |
| 5,156,179 | A * | 10/1992 | Peterson et al. | 137/78.3 |
| 5,251,942 | A * | 10/1993 | Whaley | 285/355 |
| 5,335,731 | A | 8/1994 | Ringgenberg et al. | |
| 5,465,628 | A | 11/1995 | Timmons | |
| 5,644,947 | A * | 7/1997 | Hubbell et al. | 73/73 |
| 5,758,538 | A * | 6/1998 | Hubbell et al. | 73/73 |
| 5,785,357 | A | 7/1998 | Foster et al. | |
| 5,871,050 | A * | 2/1999 | Dobson et al. | 166/278 |
| 5,889,217 | A | 3/1999 | Rossabi et al. | |
| 5,941,121 | A * | 8/1999 | Faybishenko | 73/73 |
| 6,263,726 | B1 * | 7/2001 | Hubbell et al. | 73/73 |
| 6,308,563 | B1 * | 10/2001 | Hubbell et al. | 73/152.51 |
| 6,322,110 | B1 * | 11/2001 | Banker et al. | 285/334 |
| 6,539,780 | B2 * | 4/2003 | Hubbell et al. | 73/73 |
| 6,666,480 | B2 * | 12/2003 | Haney et al. | 285/390 |
| 7,017,950 | B2 * | 3/2006 | Macaulay | 285/334 |
| 2004/0083835 | A1 * | 5/2004 | Casper et al. | 73/866.5 |

OTHER PUBLICATIONS

"Deficiencies in Vadose Zone Understanding at the Idaho National Engineering and Environmental Laboratory", T.R. Wood et al., published Aug. 2000 by Idaho National Engineering and Environmental Laboratory (INEEL), Idaho Falls, Idaho 83415, pp. 2-8.

Szeles, C. et al., "Positron Annihilation Spectroscopy," Encyclopedia of Applied Physics, vol. 14, pp. 607-623, 1996.

* cited by examiner

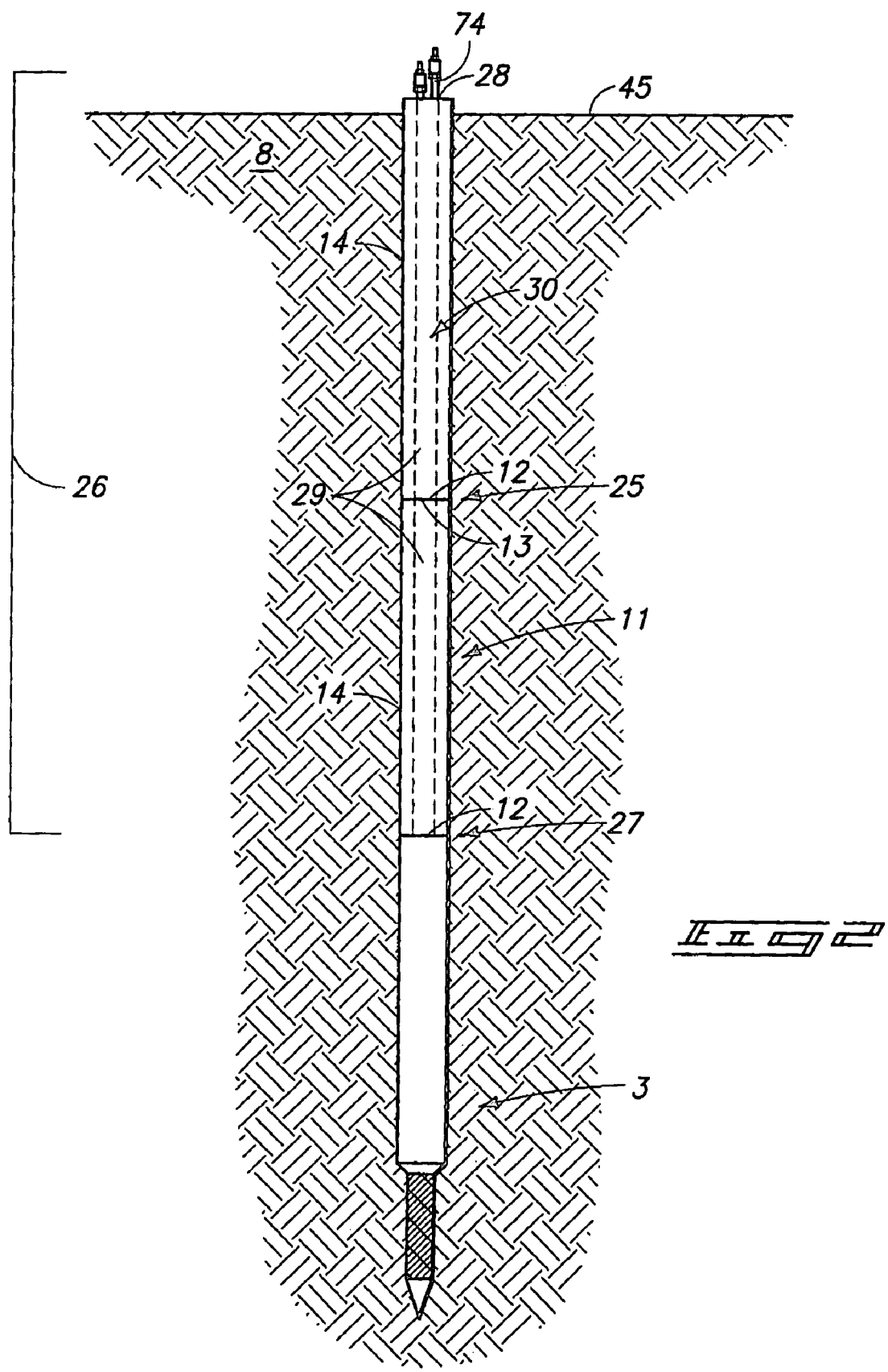

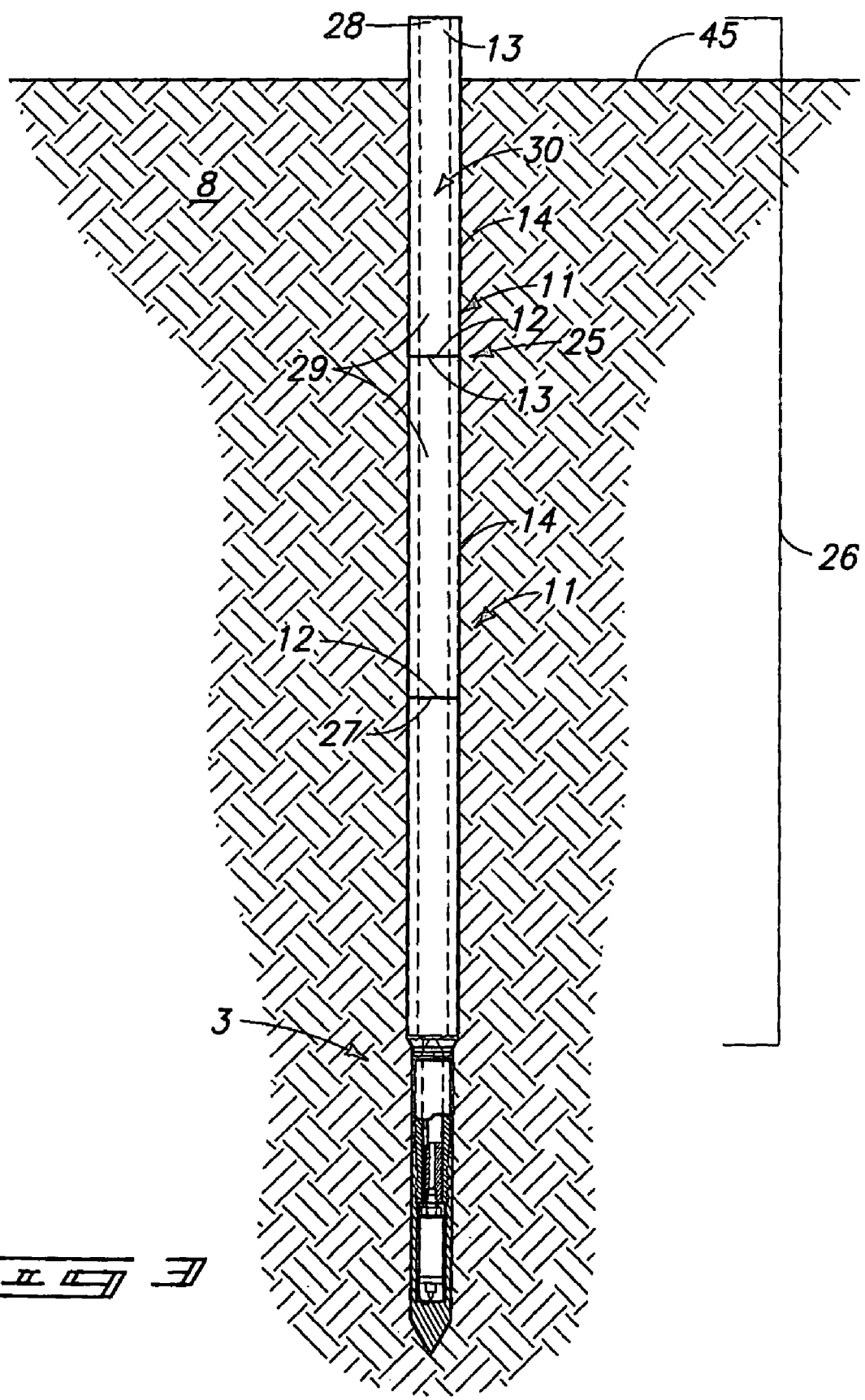

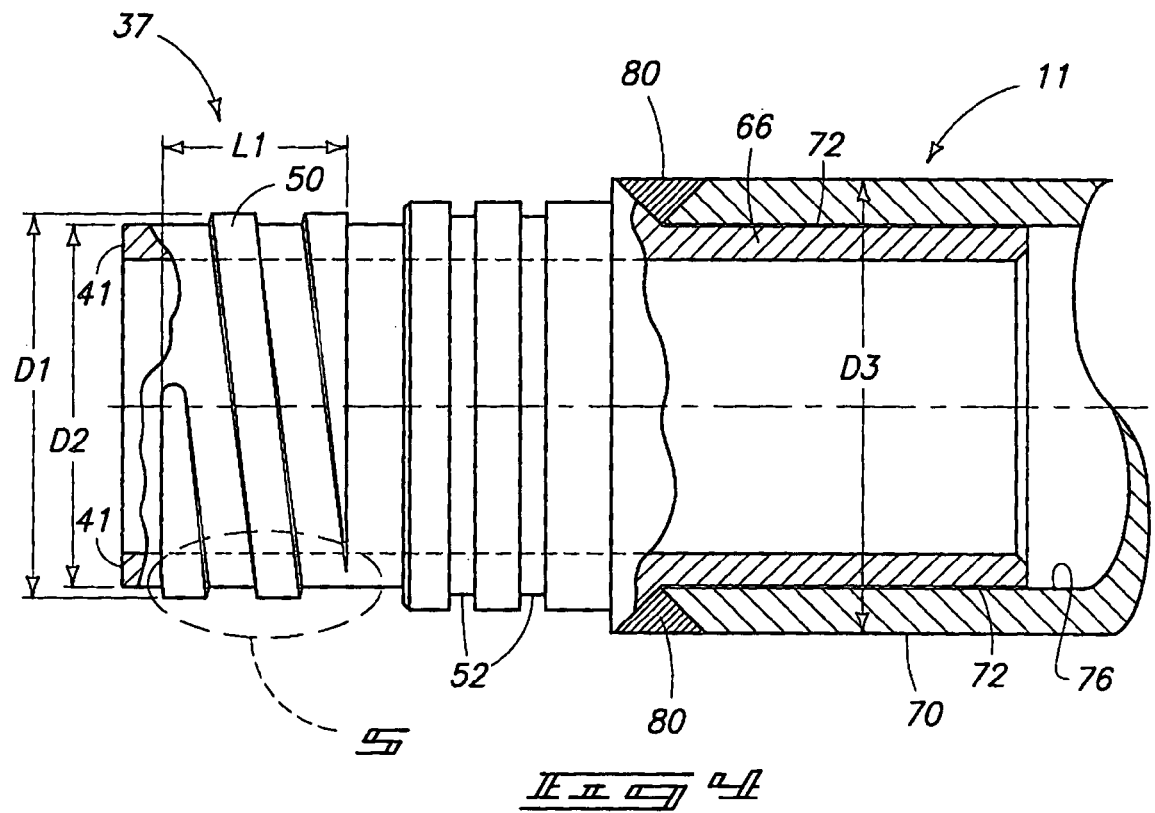
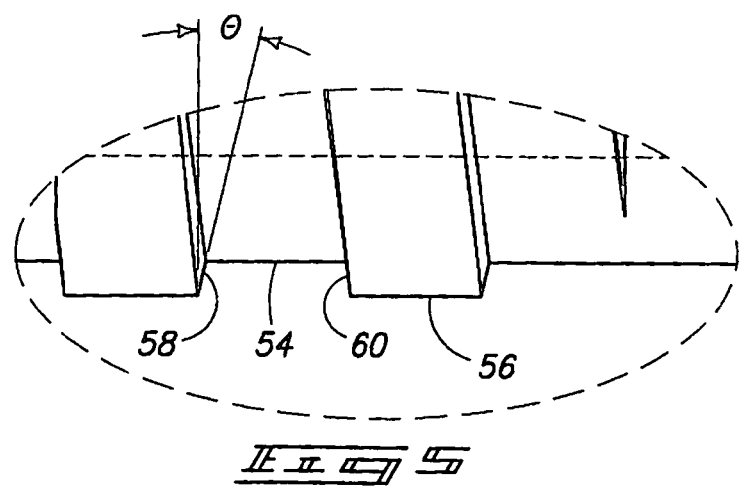

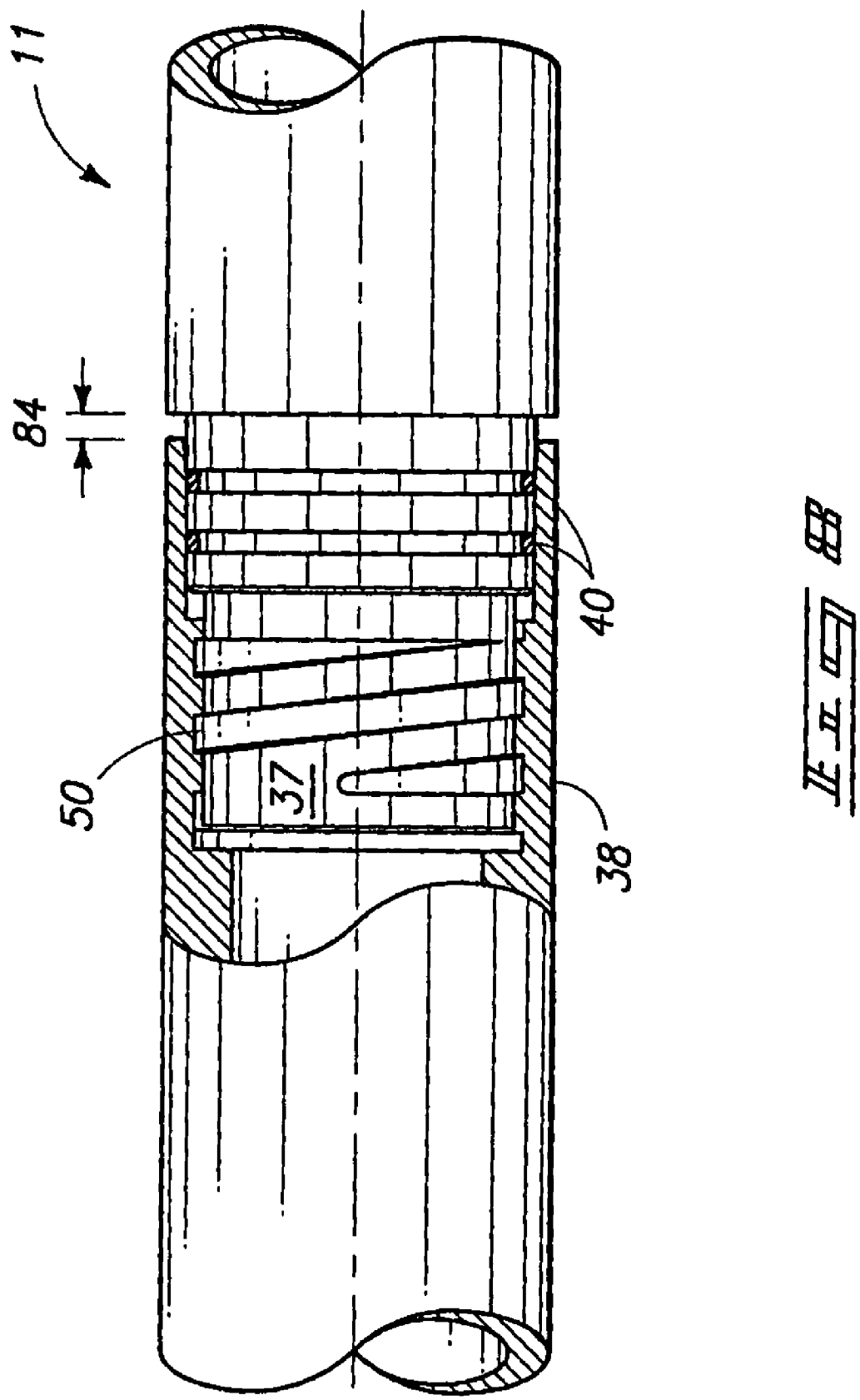

INSERTION TUBE METHODS AND APPARATUS

RELATED APPLICATIONS

This is a Continuation-in-Part of U.S. patent application Ser. No. 10/910,860, filed Aug. 3, 2004 now abandoned, which in turn is a Divisional of U.S. application Ser. No. 10/285,786, filed Oct. 31, 2002 now abandoned, by William L. Casper, et al., entitled "Insertion Tube Methods and Apparatus".

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

TECHNICAL FIELD

The invention relates to methods and apparatus for subsurface testing. More specifically the invention relates to methods and apparatus for placing instrumented probes into the ground.

BACKGROUND OF THE INVENTION

Water and associated contaminants seep into the ground and travel through a subsurface region known as the vadose zone (a region of unsaturated soil). How the water and associated contaminants move in the vadose zone, to a large degree, determines how much contamination (such as gasoline additives, agricultural chemicals, or buried waste leakage) may end up in a water supply (such as an aquifer). Therefore, gaining an understanding of how the water and associated contaminants move in the vadose zone is valuable for appropriate waste containment. Information regarding the movement of water and associated contaminants in the vadose zone is generally acquired through the use of subsurface probes or similar testing devices. Several apparatus and methods have been used to facilitate such testing and information gathering. Some of these apparatus and methods involve obtaining samples of subsurface liquids, while others test soil moisture or other parameters.

Monitoring and testing to determine the movement of subsurface water and associated contaminants is particularly valuable when dealing with waste disposal sites that contain radiological contaminants or other hazards. However, as described above, placing probes into the subsurface for data collection in such sites has not been feasible, because the placing of such probes would require drilling or coring which would bring contaminated "cuttings" to the surface and would create a pathway through which contaminated emissions may escape. As a result, testing probes have typically been placed in areas around such waste sites. Unfortunately, such probe placement only provides information when the contaminants have already migrated outside of the waste disposal site area. Moreover, at the point when the contaminants have already migrated outside of the waste disposal site area, it is likely that a major contaminant plume already exists in the subsurface soil and aquifer making remediation and containment efforts much more difficult and costly.

In view of the foregoing, it would be highly desirable to provide methods and apparatus which facilitate the installation of subsurface testing instruments in both contaminated and non-contaminated areas, while substantially avoiding these and other shortcomings of prior devices.

BRIEF DESCRIPTION OF THE DRAWINGS

Preferred embodiments of the invention are described below with reference to the following accompanying drawings.

FIG. 2 is a front elevational view, partly in section, showing the probe casings of FIG. 1 and one possible instrumented probe positioned for use in a substrate.

FIG. 3 is a front elevational view, partly in section, showing the probe casings of FIG. 1 and another possible instrumented probe positioned for use in a substrate.

FIG. 4 is an enlarged side view, partially broken away, of a probe casing showing a male threaded end in detail.

FIG. 5 is a further enlarged perspective view of the area 5 of FIG. 4.

FIG. 8 is a side view illustrating a male joint member engaged with a female joint member.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention relates to methods and apparatus for subsurface testing. More specifically, the invention relates to methods and apparatus for placing instrumented probes into a substrate. The invention allows such placement to be carried out in either contaminated or non-contaminated sites without the need for drilling or coring. In one implementation, the method includes placing an instrumented probe into the substrate using direct push, sonic drilling, or a combination of direct push and sonic drilling.

Shown in the various drawings is an apparatus 2 which facilitates placing an instrumented probe into a sample or the earth (hereinafter "the ground") 8 (FIGS. 2 and 3). The apparatus 2 may be used to facilitate the placement of a variety of instrumented probes 3 into the ground 8, as will be described in detail below with reference to FIGS. 1–3.

Figure 1:
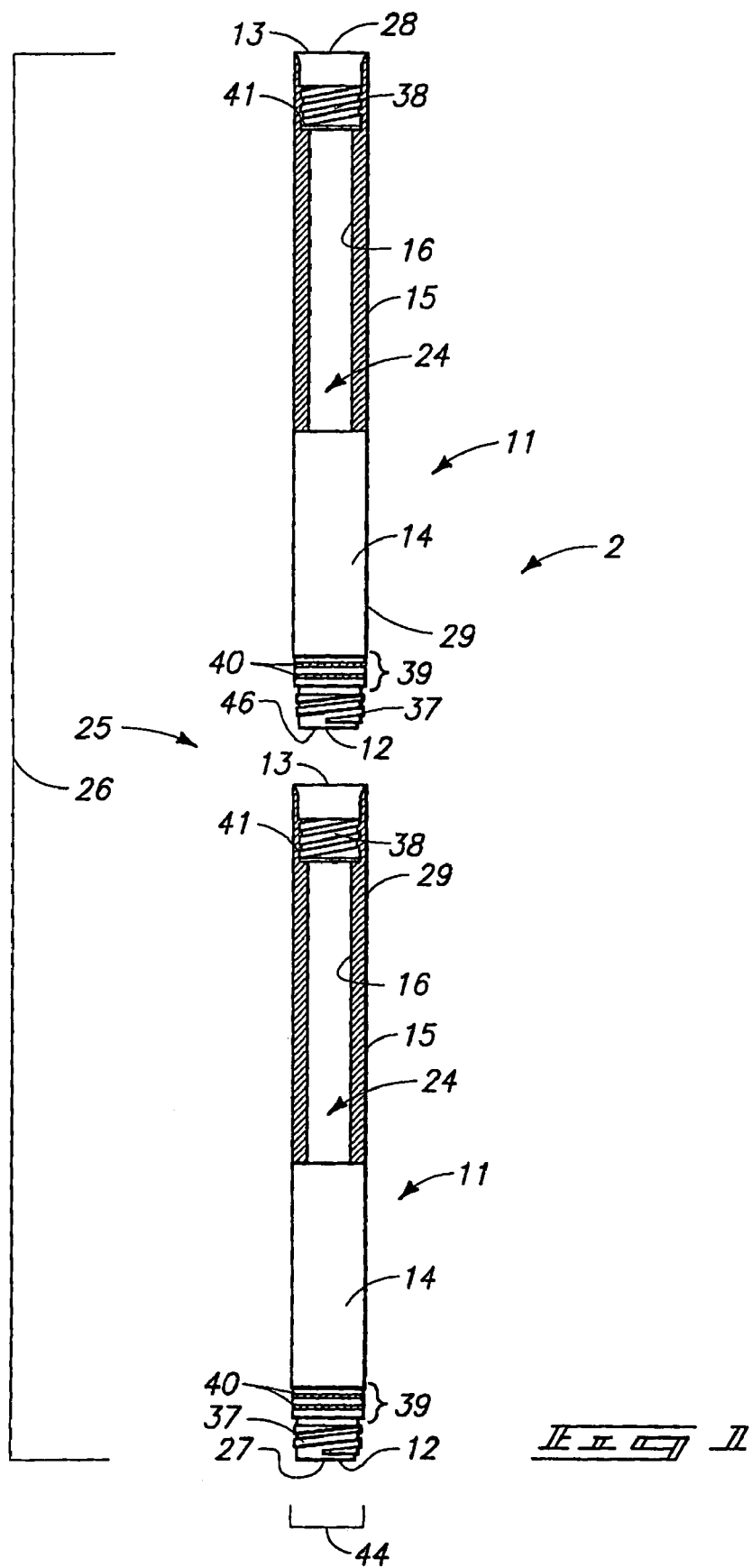
FIG. 1 is a front elevational view, partly in section, showing two probe casings in accordance with one embodiment of the present invention.

The apparatus 2 may include one or more probe casings 11. For ease of discussion, FIG. 1 depicts two such probe casings 11. Each of these probe casings 11 has an end 12 and an end 13 which are open. A sidewall 14 extends between the open ends 12 and 13. The sidewall 14 has an outer surface 15 and an inner surface 16. A probe casing cavity 24 is defined by the ends 12 and 13, and sidewall 14 of the probe casing 11. In the illustrated embodiment, the inner surface 16 is an inner cylindrical surface and the probe casing cavity 24 is a generally cylindrical void which runs the length of the probe casing 11; however other shapes are possible. In FIG. 1, a portion of the sidewall 14 has been removed, so that the probe casing cavity 24 may be seen.

As shown in the various Figures, the end 12 of one probe casing 11 is configured to be selectively coupled with the end 13 of another probe casing 11 at a casing joint 25 to form an insertion tube or drill string 26, as the instrumented probe 3 is driven into the ground 8.

The insertion tube 26, which is formed from the selectively coupled probe casings 11, includes an instrument receiving end 27, a surface end 28, and an insertion tube wall 29 which together define a central cavity 30 (indicated by phantom lines in FIGS. 2 and 3). The probe casing cavities 24 of each of the probe casings 11 which have been selectively coupled to form the insertion tube 26, together define the central cavity 30 of the insertion tube 26. The central cavity 30 is a generally cylindrical void which runs the length of the insertion tube 26; however, other shapes are possible.

As described above, the individual probe casings 11 are selectively coupled to form the insertion tube 26. The probe casings 11 may be selectively coupled using any suitable arrangement. In the embodiments depicted in FIGS. 1–3, the probe casings 11 have male and female threaded ends 37 and 38 which are used to selectively couple the respective probe casings 11. Specifically, the male threaded end 37 of one probe casing 11 is configured to selectively couple with the female threaded end 38 of another probe casing 11 at a casing joint 25 to form the insertion tube 26. The casing joints 25 respectively include a seal 39 which functions as a substantial barrier to contaminants. The seal 39 functions to substantially prevent contaminants outside of the insertion tube 26 from moving through the casing joint 25 and into the central cavity 30 of the insertion tube 26. Similarly, the seal 39 also functions to substantially prevent any contaminants which are located within the central cavity 30 from moving through the casing joint 25 and outside of the insertion tube 26.

In the embodiment shown in FIG. 1, the seal 39 comprises a plurality of seal members. Specifically, in the depicted embodiment, the seal 39 has two o-ring seals 40 which function as a substantial barrier to contaminants. The probe casings 11 also include bearing surfaces 41 and 46 which function to isolate the seal 39 and to protect the seal 39 from loads while the insertion tube 11 is being used to insert an instrumented probe 3 into the ground (see FIGS. 2 and 3). More particularly, in the illustrated embodiment, the bearing surfaces 41 and 46 isolate the seals 40 from all downward loads. Further, in the illustrated embodiment, the joint threads of threaded ends 37 and 38 isolate the seals 40 from all upward loads.

In the embodiment of FIG. 1, the probe casings 11 are stainless steel. However, any suitable material may be utilized to construct the probe casings 11. The outer wall or sidewall 14 of the probe casings 11 define an outside diameter 44. In one embodiment, the outside diameter 44 is less than 5⅝ inches. In the depicted embodiment, the outside diameter 44 is about two and one-half inches, and the thickness of the outer wall 14 is about 0.25 inches thick; other sizes are employed in alternative embodiments. The length of the probe casings 11 can be varied to suit various needs. In the illustrated embodiment, the probe casings 11 are of a size and weight that allow the probe casings 11 to be assembled by hand in the field to form the insertion tube 26 as the instrumented probe is being driven into the ground 8.

As shown in FIG. 1, the male and female threaded ends 37 and 38 are configured so that the male threaded end 37 of one probe casing 11 and the female threaded end 38 of another probe casing 11 may be easily coupled. In one embodiment, selectively coupling the male threaded end 37 of one probe casing 11 and the female threaded end 38 of another probe casing 11 requires less than four turns to fully engage the casing joint 25 and the seal 39. More particularly in the depicted embodiment, selectively coupling the male threaded end 37 of one probe casing 11 and the female threaded end 38 of another probe casing 11 requires about two and one-half turns to fully engage the casing joint 25 and the seal 39. The advantage of this is to ensure that wiring or tubing (for example, extending from an attached instrument) is minimally twisted. This thread configuration also facilitates easy assembly and disassembly of the insertion tube 26 in the field. The insertion tube 26 so formed is of an adequate durability to facilitate installation of an instrumented probe 3 into a ground 8 by direct push, by sonic drilling, or by a combination of direct push and sonic drilling.

In one embodiment, a first probe casing 11 is selectively coupled with an instrumented probe 3, as is described in detail below. After selectively coupling the first probe casing 11 with the instrumented probe 3, the instrumented probe 3 and at least a portion of the coupled first probe casing 11 are inserted into the ground 8 by direct push, by sonic drilling, or by a combination of direct push and sonic drilling. Then additional probe casings 11 are selectively coupled (one at a time), in series, to the first probe casing 11 to form an insertion tube 26 as the instrumented probe 3 is driven progressively deeper into the ground 8. The seal 39 at each of the casing joints 25 functions as a substantial barrier to contaminants, thereby preventing contaminants in the ground 8 from passing through a casing joint and entering the central cavity 30 of the insertion tube 26. Therefore, the insertion tube 26 facilitates placing an instrumented probe 3 into the ground 8 without the need for prior excavation or drilling. Examples of such instruments and probes include suction lysimeters and tensiometers. The apparatus 2 can also be used with other instrument types used for subsurface testing.

In operation, an instrumented probe 3 is selectively coupled to the instrument receiving end 27 of the insertion tube 26 (engaging a seal 39 therebetween), and is driven into the ground 8 as described above. After the final probe casing 11 has been added to the insertion tube 26, the surface end 28 of the insertion tube 26 typically protrudes from the surface 45 of the ground 8 (FIGS. 2 and 3). The central cavity 30 of the insertion tube 26 is configured to pass at least one instrument conduit 74 (FIG. 2) which extends from the instrumented probe 3 to the land's surface 45. In operation, the instrument conduits which are received by the central cavity 30, may function to transfer a liquid, to transfer a gas, to transfer data, and/or any combination of such.

FIGS. 1–3 also depict methods of forming an insertion tube 26 for placement of an instrumented probe 3 into a ground 8. One method includes providing a plurality of probe casings 11 which are to be used to form an insertion tube 26. The male threaded end 37 of a first probe casing 11 is configured to selectively couple with the female threaded end 38 of a second probe casing 11 at a casing joint 25 to form an insertion tube 26. At least one seal 39 is provided at the casing joint 25 where the male and female threaded ends 37 and 38 are to be selectively coupled. The first and second probe casings 11 are then turned relative to each other to selectively couple the male threaded end 37 of the first probe casing 11 with the female threaded end 38 of the second probe casing 11 to form the insertion tube 26. In one embodiment, the first and second probe casings 11 are turned less than four turns relative to each other to fully engage the casing joint 25 and the seal 39. In one embodiment, the first and second probe casings 11 are turned about two and one-half turns relative to each other to fully engage the casing joint 25 and the seal 39. The casing joints do not gall or friction weld to one another, and the joint between the lowermost casing and the instrumented probe does not gall or friction weld together in view of the thread arrangement. The components can be readily removed from one another. In the illustrated embodiment, the casing joints and instrument probe connection do not gall or friction weld at least because the male and female joints are fabricated from dissimilar steel grade materials. In the illustrated embodiment, the male end 37 is machined from Nitronic 50 stainless steel and the female end 38 is machined from 304 stainless steel. Different actual steel grade materials could be used, however, in the illustrated embodiment, the joints are fabricated using "dissimilar" steel grade materials for a male end 37 and a complementary female end 38, preventing the effects of galling and friction welding.

As one possible example, the casings of the respective instrumented probes 3 of FIGS. 2 and 3 comprise or are defined by stainless steel. However, any suitable material may be used to construct the casings. In one embodiment, the casing comprises stainless steel, and is of adequate durability for installation into a substrate by direct push, by sonic drilling, or by a combination of direct push and sonic drilling. When the probe casings are in the media after advancing an instrument into the media, they may be pressure tested from the top.

The invention provides robust insertion tubes that are particularly useful for driving into highly contaminated waste, as well as other uses. The insertion tubes can be driven into difficult materials (e.g., hardened soils, concrete, steel, other metals, etc.) that would typically damage other tools. In the illustrated embodiments, small diameter designs, with sufficient structural integrity, are employed that require less energy for installation into a sample. The insert tube has small diameters, but the diameters aren't so small that structural integrity is in question. Reduced energy requirements allow for smaller driving equipment resulting in lower cost.

In one embodiment, the probe casing is of all stainless steel construction for maximum corrosion resistance and long term usage. A double (redundant) o-ring seal on a non-load bearing surface impedes contamination transfer from the sample (e.g., the soil) to ground surface. The redundant seal impedes contaminants or toxic materials from interfering with or damaging instrument probes. A robust design has been disclosed for direct push, sonic, and combined direct-push and sonic loading. The design supports structural integrity and the ability to transport delicate instrumentation without damage, to a desired ground depth. A thread configuration has been disclosed that allows for assembly with minimal rotation while maintaining structural integrity, to prevent damage to instrumentation (electrical leads, tubing, etc.) as well as for field handling ease. In one embodiment, a small diameter size is used with a light casing segment for handing ease in the field. The probe casing is structurally durable and designed for retraction, replacement, and/or reuse at other sites. The casing joints do not gall or friction weld to one another, and the joint between the lowermost casing and the instrumented probe does not gall or friction weld together in view of the thread arrangement. When the probe casings are in the media after advancing an instrument into the media, they may be pressure tested from the top.

FIG. 4 is an enlarged side view, partially broken away, of a probe casing showing a male threaded end 37 in detail. The outside edges of the male threads 50 are chamfered to allow for easy alignment and engagement, but are not tapered, nor do they behave as conventional tapered threads. The threads 50 do not exhibit known weaknesses associated with tapered threads or deep stabbing technology. The minor and major diameters D1 and D2 of the thread, and pitch are all parallel (except at the start and end of the threads). In the illustrated embodiment, D1 (see FIG. 4) is 2.243 to 2.248 inches, D2 is 1.998 to 2.000 inches, overall diameter D3 is 2.5000 inches, length L1 is 1.00 inch (there are two threads per inch), and the angle $\Theta$ (see FIG. 5) is 14.0 to 14.5 degrees. The width of a male thread 50, at its outermost surface (at D1), is 0.230 to 0.232 inches, and the width of a male thread 50, at D2, is 0.260 to 0.262 inches. The distance between threads 50, at their outermost surfaces (at D1) is 0.268 to 0.270 inches, and the distance between threads 50, at D2, is 0.240 to 0.238 inches. Other dimensions are, of course, possible, with the same or different ratios of dimensions.

Although a smaller diameter could be used for D3, and this would allow easier insertion than if a larger diameter were used, a smaller diameter probe casing is more susceptible to bucking (or structural failure) both above "and" below the ground surface—particularly in buried waste areas.

The edge 58 of the thread 50 is opposite edge 60 of the thread 50 (see FIG. 5). The threads are customized. Unlike typical threads, they do not carry compression loads. The thread's top 56 and bottom 54 are flat (and parallel), contrary to conventional tapered threads. Stated in another way, the thread has an outer cylindrical surface 56 and inner cylindrical surface 54. The threads are designed for quick engagement, not to carry large loads. Extra clearance is provided between the male and female threads so that galling does not occur if dirt or grime finds its way between the threads. In some specific embodiments, the width of a male thread, at the top 56, is 0.230 to 0.232 inches and the width of a male thread at its widest, which is proximate the bottom 54, is 0.260 to 0.262 inches. The width of a corresponding female thread is 0.238–0.240 inches at its narrowest (radially outermost surfaces) and 0.268 to 0.270 inches at its widest (radially inwardmost portions of the female threads). In the illustrated embodiment, the customized threads redirect compression forces to the probe casing 70 (e.g., tube or pipe) and distributes forces evenly throughout the probe casing's full cross-section, thus transmitting large forces which would normally fail conventional threaded connections.

Tapered threads are routinely used in joints in the drilling and probing industry. These joints have significant weaknesses. The threaded joints described herein were designed to counter and eliminate these problems forming a strong joint, even stronger than the probe string segments that are being joined together.

Typically, the weakest component within a string is the joint, which is especially vulnerable in bending. The joint described herein has been designed to be the strongest member of the probe string, leaving the string itself to be the weakest link, which is contrary to conventional designs.

In the illustrated joint design, downward loads are not transmitted through joint threads, but through the male end and female end joint bearing surfaces 41 and 46. With the illustrated joint, the seal 39 and threads 50 are isolated from all loading, not just part of the loading. Thus, in the illustrated embodiment, direct-push and sonic downward loading is not carried by the threads 50. Typical drilling and probing joints have all loads transmitted through threads. The illustrated threads 50 do not carry the majority of loading. Instead, the bearing surfaces 41 and 46 carry major loads, thus isolating the seals 40 from all loading. The O-rings 40 are received in channels or reduced diameter areas 52 shown in FIG. 4.

The joint 25 will carry rotational loading, and this torsion load is also carried by the bearing surfaces 41 and 46 and not the threads. Rotation is usually not recommended for placing subsurface instruments within the ground, for it will bring unwanted drill cuttings to land surface; however, if during installation, something very hard is encountered, the insertion tube 26 could be rotated to get past the hard object and then with direct-push and/or sonic loading could be resumed.

Figure 6:
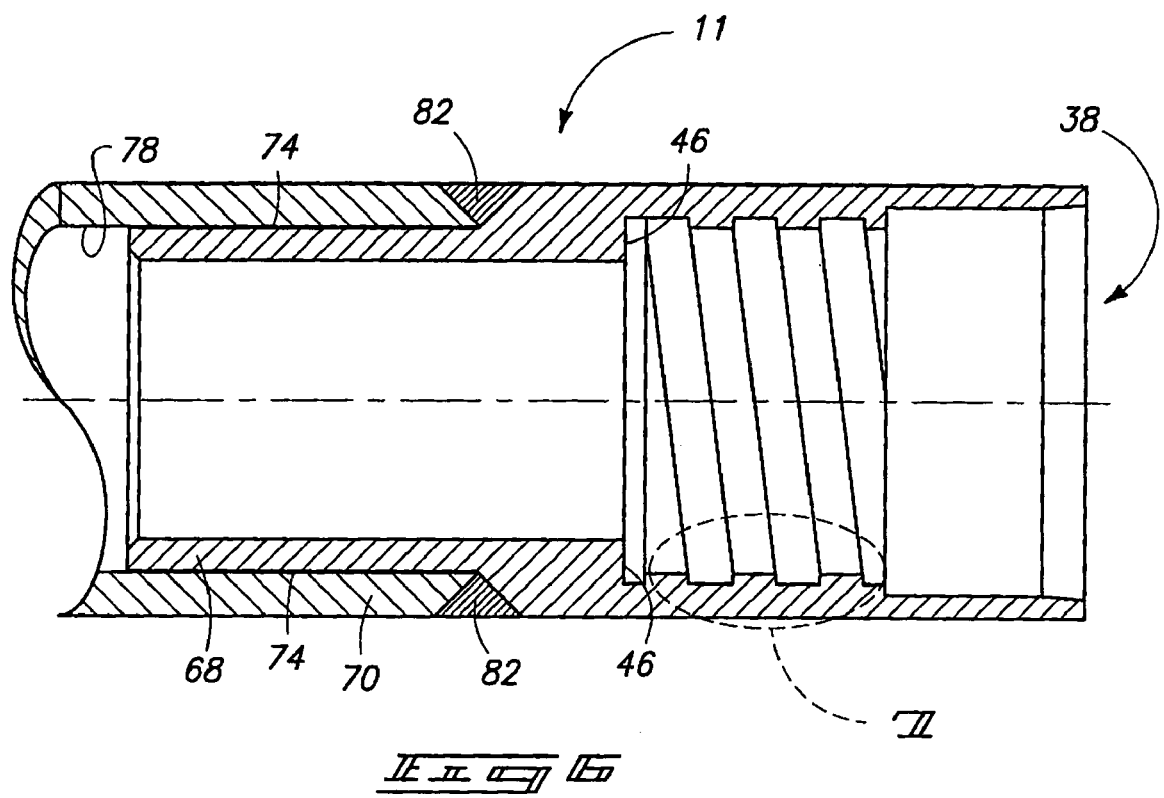
FIG. 6 is an enlarged side view, partially broken away, of a probe casing showing a female threaded end in detail.
Figure 7:
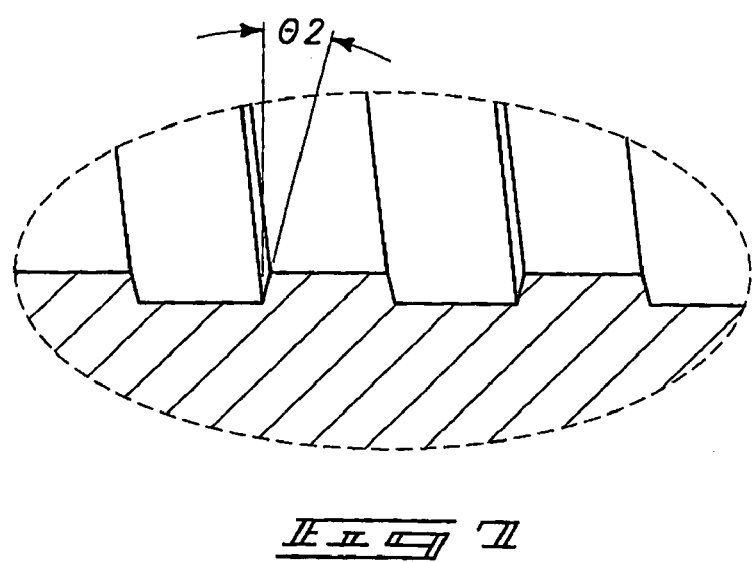
FIG. 7 is a further enlarged perspective view of the area 7 shown in FIG. 6.

FIG. 6 is an enlarged side view, partially broken away, of a probe casing showing a female threaded end in detail, in one embodiment, and FIG. 7 shows the area 7 of FIG. 6 in greater detail. In the illustrated embodiment, the angle Θ2 is 14.0 to 14.5 degrees.

There are weaknesses associated with drill and probing joints; that is, the fewer the turns required to secure components, the greater the chance that segments will separate if the string is bent. This is a typical problem with drilling and probing thread joints for the threads carry the entire load. This is not the case with the joint disclosed herein. In the joint 25, the thread does not carry the entire load and the joint has parallel extension portions 66 and 68 within the casing 70 which prevents the joint to become disengaged from bending. More particularly, the extension portions 66 and 68 are both male portions, carrying the respective threaded ends, and having cylindrical outer surfaces 72 and 74 that are slidingly received in ends of cylindrical casing 70 and engage inner cylindrical surfaces 76 and 78 of a cylindrical casing. The extension portions 66 and 68 are welded, using full penetration welds 80 and 82, respectively, to the casing 70. In fact, the joint is the strongest part of the probe string, for the probe casing itself is the weak link. Full penetration welds result in weld connections being at least as strong as the base material (for all weldable materials). This means that a full-penetration weld connection is at least as strong as if the base material was machined out of one piece and not welded at all. For steels, a full penetration weld will be approximately 5–10% stronger than the base material. In the illustrated embodiment, the use of full penetration welds 80 and 82 increase the 300-series stainless steel joints' strength properties (in the weld area) by, for example, 6.7% over the base material if it was not welded at all. This is significant. Besides the other features (i.e., joint extensions, bearing surfaces, gap) that make the joint stronger than the probe casing, the penetration weld provides additional material strength to the joint, further increasing its strength within the probe string. Other probe joints (used within industry) may welded, but not with a fully-penetrating weld. Thus, in these other designs, the joint becomes the weak link because the non-fully penetrating welds (i.e., fillets, grooves, butts, etc.) are much weaker than the base material.

The illustrated joint 25 supports a customized thread that allows easy alignment and quick engagement between mating male and female segments. In the illustrated embodiment, the joint 25 has several features that overcome the inherent problems associated with drilling and probing threads, as described following:

(1) Easy and full engagement is possible in 2 and ½ turns.

(2) Bearing surfaces between male and female joint segments are arranged so that direct-push, torsion, and sonic compression loads are not carried by the threads, but by mating male and female bearing surfaces 41 and 46. In fact, in the illustrated embodiment, there is a small gap 84 between male and female segments after the two are fully engaged.

(3) The gap between male and female joint segments eliminates all loading on dual (or redundant) seals 40. Also, loads and strains on seals associated with locking traditional joints together are eliminated.

(4) The seals 40 provide a contamination barrier to the insertion tube and subsurface instruments. The seals 40 also allow integrity testing of the insertion tube and subsurface instruments below the ground surface.

(5) The male and female threaded ends 37 and 38 have extensions 66 and 68 within the insertion tube that hold the joint together and impede segment disengagement—a common problem that is associated with conventional drilling and probing joint threads.

(6) Bearing surfaces 41 and 46 are loaded through compression loading and the customized threads 37 are loaded through sonic tension loading (significantly less than compression). This feature alone provides the following benefits:

Lower strength materials (steels) may be used for the insertion tube, significantly reducing cost.

Joints need not be hardened (or heat-treated) for they do not have to withstand large compression loads—as is required of conventional drilling and probing threaded joints.

Ideal for use of stainless steel (which is soft steel) and ideal to prevent corrosion build-up and prevent contaminate transfer.

Ideal for easy alignment and thread engagement.

Smaller diameter insert tube sections maintain structural integrity and allow for lighter (or lower weight) casings, providing for significant cost reduction in handling and supporting equipment usage.

FIGS. 4 to 7 show features provided in various embodiments. The customized threads allow for easy alignment and full engagement (e.g., in 2 and ½ turns). Bearing surfaces 41 and 46 absorb all compression loads (which provided the largest magnitudes during installation), thus preserving the threads for smaller sonic tension and probe string retrieval loads. This allows the use of softer steel materials (i.e., like stainless steel) that do not require joint hardening or expensive heat-treatment, as is commonly done on conventional drill string joints such that they can withstand large installation drill rig forces. Stainless steel is a desired material for the insertion tube, in some embodiments, that is used to install subsurface instruments, for it has excellent corrosion resistance properties and will not bias the samples taken from surrounding medium. Extensions 66, 68 help prevent joint segments from separating, as is an inherent problem when using conventional drilling/probing threads. The extensions absorb bending loads (i.e., forces and moments) and make the joint the strong component. The seals 40 are isolated from all installation loads and provide a contamination barrier to the insertion tube and subsurface instruments. The seals 40 also allow integrity testing of the insertion tube and subsurface instruments below the ground surface.

FIG. 8 is a side view illustrating a male joint member engaged with a female joint member. A gap 84 exists between the male and female ends 37 and 38, after coupling. This gap, as well as the use of dissimilar materials, aids in allowing components (e.g., between ends 37 and 38, as well as the joint with a probe 3) to be readily removed from one another. The gap 84 not only shields the seals 40 from installation and removal (i.e., downward and upward) loading, it also prevents seal strain from locking joints together.

Probe joints used in industry are typically locking, meaning that they scrape mating components together, and often place additional strain on seals. Many times, o-ring seals fail (or tear) when joints are tightened together, for the last turn bites into the mating section and friction is main means of locking joint together. The joint of the illustrated embodiment maintains the gap 84 between mating joint sections, even when fully engaged. This allows for easy component removal and eliminates traditional joint lock loads/strains on seals.

In some embodiments, the insertion tube is particularly useful within buried waste areas; however, the joint features could also be used in applications outside the field of waste. The joint design provided herein ameliorates the inherent problems associated with conventional drilling and probing (or tapered) threads.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of placing a lysimeter into a media without drilling, the method comprising:
    providing a probe, instrumented with a lysimeter, which is to be driven into a media, the instrumented probe having a tip portion and a drive portion;
    providing a plurality of probe casings, respective probe casing having male and female threaded ends, the male threaded end of a first probe casing being configured to selectively couple with the female threaded end of a second probe casing at a casing joint to form an insertion tube;
    providing at least one seal at the casing joint where the male threaded end of the first probe casing and the female threaded end of the second probe casing are to be selectively coupled and providing bearing surfaces in the male threaded end of the first probe casing and female threaded end of the second probe casing configured to isolate the seal from insertion compression loads and joint locking loads, the male threaded end including a thread in the general shape of a box thread and having an outer cylindrical surface, and an inner cylindrical surface, the female threaded end having a complementary female thread, the female threaded end having a tip, wherein the male threaded end of the first probe casing has a threaded portion having an exterior diameter and has a non-threaded portion with an exterior diameter greater than the diameter of the threaded portion, wherein when the male threaded end of the first probe casing is fully engaged with the female threaded end of the second probe casing, a gap exists between the non-threaded portion of the male threaded end and the tip of the female threaded end;
    turning the first and second probe casings relative to each other not more than four turns to selectively couple the male threaded end of the first probe casing with the female threaded end of the second probe casing to form the insertion tube; and
    installing the probe using at least one of direct push and sonic drilling.

2. The method of claim 1 wherein the turning the first and second probe casings relative to each other to selectively couple the male threaded end of the first probe casing with the female threaded end of the second probe casing to form the insertion tube, comprises turning less than four turns to fully engage the casing joint with at least one seal.

3. The method of claim 1 wherein the turning the first and second probe casings relative to each other comprises about two and one-half turns to fully engage the casing joint and at least one seal.

4. The method of claim 1 wherein the probe is constructed and arranged to be capable of being advanced into a media to a depth greater than 30 meters.

5. The method of claim 1 and further comprising retrieving and reusing the probe casings.

6. The method of claim 1 and further comprising pressure testing the probe casings while the probe casings are in the media after advancing the lysimeter into the media.

7. The method of claim 1 wherein coupling the male threaded end of the first probe casing with the female threaded end of the second probe casing does not result in friction welding of the first probe casing to the second probe casing.

8. The method of claim 1 wherein coupling the male threaded end of the first probe casing with the female threaded end of the second probe casing does not result in galling of the first probe casing to the second probe casing.

9. A method of placing tensiometer into a media without drilling, the method comprising:
    providing a probe, instrumented with a tensiometer, which is to be driven into a media, the instrumented probe having a tip portion and a drive portion;
    providing a plurality of probe casings, respective probe casings having male and female threaded ends, the male threaded end of a probe casing including a male thread having the general shape of a box thread and having an outer cylindrical surface, an inner cylindrical surface, and parallel edges between the outer cylindrical surface, the female threaded end of a probe casing having a complementary female thread, and the male thread end of one of the probe casings being configured to selectively couple with the female threaded end of another of the probe casings at a casing joint to form an insertion tube;
    providing at least one seal at the casing joint where the male threaded end of the first probe casing and the female threaded end of the second probe casing are to be selectively coupled and providing bearing surfaces in the male threaded end of the first probe casing and female threaded end of the second probe casing configured to isolate the seal from insertion compression loads and joint locking loads;
    turning the first and second probe casings relative to each other to selectively couple the male threaded end of the first probe casing with the female threaded end of the second probe casing to form the insertion tube; and
    installing the probe using at least one of direct push and sonic drilling.

10. The method of claim 9 wherein the turning the first and second probe casings relative to each other comprises turning less than four turns to fully engage the casing joint with at least one seal.

11. The method of claim 9 wherein the turning the first and second probe casings relative to each other to selectively couple the male threaded end of the first probe casing with the female threaded end of the second probe casing to form the insertion tube, comprises about two and one-half turns to fully engage the casing joint and at least one seal.

12. The method of claim 9 wherein the probe is constructed and arranged to be capable of being advanced into a media to a depth greater than 30 meters.

13. The method of claim 9 and further comprising retrieving and reusing the probe casings.

14. The method of claim 9 and further comprising pressure testing the probe casings while the probe casings are in the media after advancing the tensiometer into the media.

15. The method of claim 9 wherein coupling the male threaded end of the first probe casing with the female threaded end of the second probe casing does not result in friction welding of the first probe casing to the second probe casing.

16. The method of claim 9 wherein coupling the male threaded end of the first probe casing with the female threaded end of the second probe casing does not result in galling of the first probe casing to the second probe casing.

* * * * *